United States Patent [19]

Harper et al.

[11] 3,843,739

[45] *Oct. 22, 1974

[54] PROCESS FOR TRANSALKYLATING DIETHYL BENZENE

[75] Inventors: Earl F. Harper, Oakmont; Roger C. Williamson, Allison Park, both of Pa.

[73] Assignee: Gulf Research and Development Company, Pittsburgh, Pa.

[ * ] Notice: The portion of the term of this patent subsequent to Oct. 30, 1990, has been disclaimed.

[22] Filed: May 16, 1973

[21] Appl. No.: 360,680

Related U.S. Application Data

[63] Continuation-in-part of Ser. No. 132,887, April 9, 1971, Pat. No. 3,769,360.

[52] U.S. Cl............................ 260/672 T, 260/671 R
[51] Int. Cl............................................. C07c 3/62
[58] Field of Search .................... 260/672 T, 671 R

[56] References Cited
UNITED STATES PATENTS 3,551,510   12/1970   Pollitzer et al.................. 260/672 T

*Primary Examiner*—C. Davis

[57] ABSTRACT

Process for transalkylating diethyl benzene to ethyl benzene with involves reacting benzene with ethylene to obtain a reaction product predominating in ethyl benzene and containing lesser amounts of polyalkyl benzenes and then contacting the total alkylation product with a zeolitic molecular sieve catalyst to transalkylate the polyalkyl benzenes to ethyl benzene.

10 Claims, No Drawings

PROCESS FOR TRANSALKYLATING DIETHYL BENZENE

This application is a continuation-in-part application of our application Ser. No. 132,887, filed Apr. 9, 1971, entitled PROCESS FOR TRANSALKYLATING DIETHYL BENZENE, now U.S. Pat. No. 3,769,360, which application is incorporated herein by reference.

This invention relates to a process wherein benzene is alkylated with ethylene, for example, in the presence of a zeolitic molecular sieve catalyst, to obtain a reaction product predominating in ethyl benzene and containing lesser amounts of polyalkyl benzenes, as well as unreacted benzene, and said reaction product is then treated in the presence of a zeolitic molecular sieve catalyst to transalkylate said polyalkyl benzenes to ethyl benzene.

Ethyl benzene can be produced by the alkylation of benzene with ethylene in the presence of any well-known alkylation catalysts, for example, aluminum chloride, phosphoric acid, a zeolitic molecular sieve catalyst, such as that used in the transalkylation herein, etc., using well-known alkylation conditions. However, depending upon the alkylation catalyst employed and the alkylation conditions found to be suitable, not only will desired ethyl benzene be produced but from about one to about 40 percent by weight, generally from about six to about 15 percent by weight of the total alkylate obtained will be composed of di-, tri- and tetraethyl benzenes of which about 99 to about 65 percent by weight, generally about 97 to about 85 percent by weight, will be diethyl benzenes. In accordance with the process defined and claimed herein the total alkylation product containing benzene, ethyl benzene and di-, tri- and tetraethyl benzenes is subjected to transalkylation conditions in the presence of benzene and a zeolitic molecular sieve catalyst to convert the same to ethyl benzene.

In U.S. Pat. No. 3,385,906 to Kaufman it is shown that diisopropyl benzene can be transalkylated to cumene in the presence of a zeolitic molecular sieve catalyst. In column 5, lines 11 to 14, the patentee states that in order to obtain the desired conversion it is essential to maintain a liquid phase system. We have found, instead, that in order to transalkylate di-, tri- and tetraethyl benzenes in the total alkylation product to ethylbenzene in the presence of a zeolitic molecular sieve catalyst it is imperative that the system be maintained such that benzene is essentially in the vapor phase.

The alkylation product containing benzene, ethyl benzene and di-, tri- and tetraethyl benzenes that is to be transalkylated herein can be obtained by subjecting benzene to alkylation with ethylene in the presence of any well-known alkylation catalyst, for example, in the presence of the zeolitic molecular sieve catalyst used in the process defined and claimed herein. For example, an alkylation product can be obtained by passing benzene and ethylene in a molar ratio of about 1:1 to about 50:1, preferably about 4:1 to about 15:1, upwardly through a bed of said zeolitic molecular sieve catalyst at a weight hourly space velocity (combined weight of benzene and ethylene per weight of catalyst per hour) of about 0.1 to about 100, preferably about 1 to about 20, a temperature of about 100° to about 400° C., preferably about 150° to about 270° C., and a pressure of about 0 to about 2000 pounds per square inch gauge, preferably about 100 to about 600 pounds per square inch gauge. The product obtained will contain, as previously noted, unreacted benzene, ethyl benzene and di-, tri- and tetraethyl benzenes. In the process claimed and defined herein the entire alkylation product is used as charge to the transalkylation stage.

The transalkylation defined and claimed herein is simply effected, in batch operations or continuously. Thus, the entire alkylation product, as hereinabove defined, together with additional benzene, if needed, is passed upwardly through a bed of zeolitic molecular sieve catalyst under the critical reaction conditions that will be defined hereinafter. The molar ratio of benzene to polyalkyl benzenes is from about 200:1 to about 10:1, preferably from about 120:1 to about 40:1. Most critical to successful transalkylation lies in maintaining the benzene present in the mixture to be transalkylated in the vapor phase. Conditions are selected sufficient to maintain the desired vapor phase. Thus, the temperature lies within the range of about 100° to about 500° C., preferably within the range of about 150° to about 270°C., and the pressure from about 5 to about 500 pounds per square inch gauge, preferably within the range of about 16 to about 300 pounds per square inch gauge, with such pressure being lower than the pressure prevailing in the alkylation stage, when a zeolitic molecular sieve catalyst is used in said latter stage. A space velocity (combined weight of benzene and polyalkyl benzenes per weight of catalyst per hour) of about 0.1 to about 80, preferably about one to about 15, can be used. At the end of the reaction period the individual components, for example, unreacted benzene, ethylbenzene and diethyl benzene can be recovered from the reaction product by simple distillation techniques.

The catalysts used in the transalkylation herein, and which can be used in alkylation benzene with ethylene to produce polyalkyl benzenes used as charge in the transalkylation stage, are zeolitic molecular sieve catalysts, such as defined and used in said U.S. Pat. No. 3,385,906, that is, a crystalline zeolitic molecular sieve catalyst, for example, natural or synthetic hydrated metal alumino-silicates, consisting basically of an open, three-dimensional framework of $SiO_4$ and $AlO_4$ tetrahedra, having a silica to alumina molar ratio of at least about 3.0, a pore size large enough to permit internal absorption of benzene and not more than 90 percent of their aluminum atoms associated with monovalent cations, for example, sodium or potassium, and the remainder with polyvalent cations, for example, lanthanum, cerium, etc. and/or ammonium or hydrogen. A particularly effective zeolite is a zeolite Y such as defined in U.S. Pat. No. 3,130,007. An example of zeolite Y will fall within the following chemical composition:

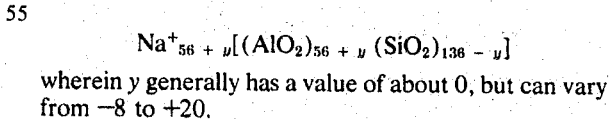

wherein $y$ generally has a value of about 0, but can vary from −8 to +20.

The process of this invention can further be illustrated by the following, in each run of which a Y zeolitic molecular sieve of the following unit cell formula was used:

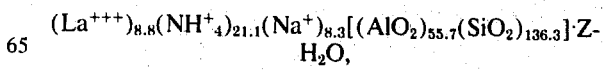

which had been previously heated to a temperature of about 550° C. for about 1 hour, with, presumably, the loss of $NH_3$ and $H_2O$ therefrom. In each of the runs a ½ inch inner diameter 52-inch long stainless steel reactor, equipped with a 3-inch by 50-inch outer jacket filled with dixylylethane as a heat transfer medium was used. Heat was supplied with a calrod electrical heater and was controlled by a thermoelectric controller. A thermowell extended coaxially through the reactor. The temperature in the reactor was measured by thermocouples evenly spaced through the preheat section, catalyst bed and support section. The pressure was controlled by means of a pressure control valve in the effluent line. Feed to the reactor was pumped upflow by an adjustable stroke proportioning pump from a calibrated feed tank. The reactor was filled with a preheat section of glass beads to a depth of 14 inches. The catalyst section, 13 inches in depth, was composed of 10 grams of the specific 10 to 20 mesh Y-type zeolitic molecular sieve catalyst defined immediately hereinabove diluted with two volumes of 8 to 10 mesh quartz. The remaining reactor length was filled with glass beads. The effluent from the reactor was cooled and collected in a gas-liquid separator. The off-gas was measured by a wet test meter, while the liquid product was recovered and weighed.

Example I

To a pressure cylinder 168.7 pounds of benzene was added. By means of a dip leg 6.06 pounds of ethylene was dissolved in the benzene. The feed cylinder was pressured with nitrogen to keep the ethylene in solution at around 250 pounds per square inch gauge. The molar ratio of benzene to ethylene was 10:1. Using the above apparatus and feed a series of alkylation runs was carried out using different space velocities (number of grams of feed per hour per gram of catalyst charged to the reactor), pressures and temperatures. Complete conversion of ethylene was found except where noted. The results obtained are set forth in Table I below. In the Table efficiencies are expressed in mol percent and are defined as the mols of ethyl benzene, diethyl benzene, triethyl benzene and tetraethyl benzene produced per mol of benzene or ethylene reacted times 100. Vent gases from the reactor was analyzed by mass spectrographic methods. The liquid products were analyzed by gas chromatography.

alkylation has little or no appreciable effect on the efficiency to ethyl benzene and that an equilibrium between the latter and diethyl benzene is obtained in each case. The results, at the lower pressure, are derived somewhat from the low pressures, so that the reactants are in the vapor phase, but also are due to the benzene/ethylene ratio being essentially equal to 40–30 to 1.

Example II

It might be thought, therefore, that if diethyl benzene were added to the feed to the alkylation unit with an excess of benzene an increase in efficiency to ethyl benzene would, therefore, result. To this end a feed containing 5290 grams of benzene (95.45 weight percent), 62.0 grams of diethyl benzene (1.12 weight percent) and 190 grams of ethylene (3.43 weight percent) was passed over the zeolitic molecular sieve catalyst at 234° C., 500 pounds per square inch gauge and a liquid hourly space velocity of 40.4 with 100 percent conversion of ethylene. The efficiency, in mol percent based on the benzene reacted, was 90.96 mol percent ethyl benzene, 5.53 mol percent diethyl benzene, 1.91 mol percent triethyl benzene and 1.06 percent tetraethyl benzene. When this run was repeated at 232° C., 500 pounds per square inch gauge and a liquid hourly space velocity of 22.9, all of the ethylene was converted with molar efficiencies of 91.7 percent to ethyl benzene, 5.24 percent to diethyl benzene, 2.13 percent to triethyl benzene and 0.94 percent to tetraethyl benzene. From these two runs it can be seen that the expected improvement in yields to ethyl benzene was not obtained.

Example III

A series of runs was made wherein benzene was alkylated with ethylene over the specific zeolite molecular sieve catalyst used hereinabove and the total effluent was treated in a separate reactor over the same catalyst. In the first reactor benzene and ethylene were used in a 10:1 molar ratio and the reaction was carried out at a temperature of 224° C., a pressure of 500 pounds per square inch gauge at a liquid weight hourly space velocity of 21. The conditions employed in the Table I

| Run Number | 1 | 2 | 3 | 4 | 5 | 6 | 7 | 8 | 9 | 10 |
|---|---|---|---|---|---|---|---|---|---|---|
| Temperature | 173 | 192 | 210 | 232 | 210 | 210 | 210 | 210 | 232 | 232 |
| Pressure, PSI Gauge | 550 | 550 | 600 | 600 | 600 | 600 | 600 | 600 | 300 | 80 |
| Space Velocity | 19.47 | 19.46 | 19.20 | 10.0 | 19.2 | 39.8 | 81.1 | 4.3 | 8.8 | 23 |
| Efficiencies In Mol Per Cent Based On Benzene Converted To | | | | | | | | | | |
| Ethyl Benzene | 87.52 | 85.87 | 88.26 | 87.32 | 88.26 | 88.16 | 88.43 | 89.25 | 89.31 | 98.6[a] |
| Diethyl Benzene | 8.54 | 9.67 | 8.31 | 8.14 | 8.31 | 8.26 | 8.33 | 8.67 | 8.77 | 1.4 |

[a] Ethylene conversion only 25 to 30 per cent

The above clearly shows that when one has 100 percent ethylene conversion that varying the conditions of alkylation has little or no appreciable effect on the efficiency to ethyl benzene and that an equilibrium between second reactor and the results obtained are tabulated below in Table II.

Table II

| Run Number | Feed | 1 | 2 | 3 | 4 | 5 | 6 | 7 | 8 | 9 | 10 |
|---|---|---|---|---|---|---|---|---|---|---|---|
| Reaction Conditions | | | | | | | | | | | |
| Temp., °C. | — | 214 | 213 | 213 | 213 | 213 | 212 | 212 | 212 | 212 | 212 |
| Pressure, PSI Gauge | — | 16 | 34 | 60 | 80 | 100 | 120 | 150 | 180 | 200 | 250 |
| Liquid Wt. Hourly Space Velocity | — | 3.3 | 3.1 | 3.2 | 2.3 | 3.1 | 3.1 | 3.0 | 3.0 | 2.9 | 2.9 |
| Efficiencies Based On Benzene, Mol Percent | | | | | | | | | | | |
| Ethyl Benzene | 89.51 | 95.39 | 95.46 | 95.76 | 97.88 | 98.72 | 99.33 | 97.35 | 94.63 | 93.40 | 89.09 |
| Methyl Ethyl Benzene | 0.50 | 0.63 | 0.60 | 0.63 | 0.75 | 0.63 | 0.43 | 0.72 | 0.56 | 1.64 | 0.67 |
| Diethyl Benzene | 8.42 | 3.98 | 3.94 | 3.61 | 1.37 | 0.65 | 0.24 | 1.93 | 4.81 | 5.04 | 8.01 |
| Triethyl Benzene | 0.98 | — | — | — | — | — | — | — | — | 0.47 | 1.47 |
| Tetraethyl Benzene | 0.59 | — | — | — | — | — | — | — | — | 0.45 | 0.75 |

The above data show that best results are obtained when the transalkylation reaction is caried out while maintaining benzene in the reaction mixture in the vapor phase. For example, in Runs Nos. 1 to 9, while operating at a temperature in the range of 212° to 214° C. and a pressure of 16 to 200 pounds per square inch gauge (1.13 to about 14.06 kilograms per square centimeter), which was sufficient to maintain benzene in substantially the vapor phase, excellent conversions of polyalkyl benzenes to ethyl benzene were obtained, with best results appearing at a pressure of 80 to 150 pounds per square inch gauge (5.63 to about 10.55 kilograms per square centimeter). In Run No. 10, however, benzene was not in the vapor phase and no appreciable conversions of polyalkyl benzenes were obtained.

Obviously, many modifications and variations of the invention, as hereinabove set forth, can be made without departing from the spirit and scope thereof, and, therefore, only such limitations should be imposed as are indicated in the appended claims.

We claim:

1. A process for preparing ethyl benzene which consists essentially in subjecting benzene to alkylation with ethylene to obtain an alkylation product containing unreacted benzene, diethyl benzene and polyalkyl benzenes and then subjecting said alkylation product, while maintaining the benzene therein in the vapor phase, to contact with a zeolitic molecular sieve having a pore size large enough to permit the internal absorption of benzene, a silica to alumina molar ratio of at least about 3.0 and no more than 90 percent of aluminum atoms associated with monovalent cations, at a temperature of about 100° to about 500° C. and a pressure of about 5 to about 500 pounds per square inch gauge.

2. The process of claim 1 wherein the temperature is in the range of about 150° to about 270° C. and the pressure about 16 to about 300 pounds per square inch gauge.

3. The process of claim 1 wherein the molar ratio of benzene to said polyalkyl benzenes in the alkylation product is from about 200:1 to about 10:1.

4. The process of claim 1 wherein the molar ratio of benzene to said polyalkyl benzenes in the alkylation product is from about 120:1 to about 40:1.

5. The process of claim 1 wherein the alkylation charge is passed through the zeolitic molecular sieve using a space velocity of about 0.1 to about 80.

6. The process of claim 1 wherein the alkylation charge is passed through the zeolitic molecular sieve using a space velocity of about one to about 15.

7. The process of claim 1 wherein the remainder of the cations associated with said aluminum atoms are rare earth metal cations.

8. The process of claim 1 wherein the remainder of the cations associated with said aluminum atoms are lanthanum cations.

9. The process of claim 1 wherein said alkylation is carried out with a zeolitic molecular sieve as defined in claim 1.

10. The process of claim 1 wherein the alkylation is carried out while maintaining benzene in the liquid phase.

* * * * *